US009907291B2

(12) United States Patent
Lathim

(10) Patent No.: US 9,907,291 B2
(45) Date of Patent: Mar. 6, 2018

(54) PET CARE SYSTEM

(71) Applicant: Melissa Lathim, Pasco, WA (US)

(72) Inventor: Del Lathim, Pasco, WA (US)

(*) Notice: Subject to any disclaimer, the term of this patent is extended or adjusted under 35 U.S.C. 154(b) by 6 days.

(21) Appl. No.: 14/571,157

(22) Filed: Dec. 15, 2014

(65) Prior Publication Data
US 2015/0096649 A1 Apr. 9, 2015

Related U.S. Application Data

(63) Continuation-in-part of application No. 12/944,624, filed on Nov. 11, 2010, now Pat. No. 9,137,967.

(60) Provisional application No. 61/261,058, filed on Nov. 13, 2009, provisional application No. 61/917,218, filed on Dec. 17, 2013.

(51) Int. Cl.
| | |
|---|---|
| A01K 5/02 | (2006.01) |
| A01K 7/02 | (2006.01) |
| A01K 1/01 | (2006.01) |
| A01K 5/01 | (2006.01) |
| G07F 11/44 | (2006.01) |

(52) U.S. Cl.
CPC .......... *A01K 5/0225* (2013.01); *A01K 1/0107* (2013.01); *A01K 5/0114* (2013.01); *A01K 7/02* (2013.01); *G07F 11/44* (2013.01)

(58) Field of Classification Search
CPC ............................... A01K 5/00; A01K 5/0225
USPC ........ 141/198, 363, 364, 365, 366; 119/52.1
See application file for complete search history.

(56) References Cited

U.S. PATENT DOCUMENTS

| | | | |
|---|---|---|---|
| 1,186,369 | A | 6/1916 | Barlow |
| 1,533,627 | A | 4/1925 | Averill |
| 1,815,964 | A | 7/1931 | Boyer |
| 1,816,684 | A | 7/1931 | Liechty |
| D106,782 | S | 11/1937 | DeBenque |
| 2,207,417 | A | 7/1940 | Smith |
| D176,252 | S | 12/1955 | Duncan |
| 2,843,287 | A | 7/1958 | Finley |
| 2,943,600 | A | 7/1960 | Rosoff |
| 3,111,932 | A | 11/1963 | Knutson |
| 3,354,868 | A | 11/1967 | Woodling |
| 3,763,826 | A | 10/1973 | Portelli |
| 3,954,086 | A | 5/1976 | Maness |
| D244,948 | S | 7/1977 | Foley et al. |
| 4,120,420 | A | 10/1978 | Dirksing |

(Continued)

FOREIGN PATENT DOCUMENTS

WO 9610907 4/1996

OTHER PUBLICATIONS

Non-Final Office Action dated Oct. 22, 2012 from U.S. Appl. No. 12/944,624, 7 pages.

(Continued)

*Primary Examiner* — Timothy L Maust
(74) *Attorney, Agent, or Firm* — Rainier Patents, P.S.; Paul W. Mitchell; Remembrance Newcombe

(57) ABSTRACT

The present discussion relates to a material dispensing system. In one example, the material dispensing system includes a material dispenser apparatus and a material container. In this example, the material dispenser apparatus can receive the material container such that both solid material and liquid material automatically dispense from the material container into a material presentation portion of the material dispenser apparatus in a self-regulating manner.

9 Claims, 10 Drawing Sheets

(56) References Cited

U.S. PATENT DOCUMENTS

| | | | | |
|---|---|---|---|---|
| 4,134,365 A * | 1/1979 | Futers | .................. | A01K 5/0225 119/51.5 |
| 4,271,544 A | 6/1981 | Hammond | | |
| 4,303,039 A * | 12/1981 | Thibault | .............. | A01K 5/0225 119/52.1 |
| 4,465,018 A | 8/1984 | Mopper | | |
| 4,562,940 A | 1/1986 | Asphar | | |
| 4,573,434 A | 3/1986 | Gardner | | |
| 4,721,063 A | 1/1988 | Atchley | | |
| 4,840,143 A * | 6/1989 | Simon | .................. | A01K 5/0225 119/52.1 |
| 5,016,572 A * | 5/1991 | Weber | ................. | A01K 39/012 119/52.1 |
| 5,058,528 A | 10/1991 | Counseller et al. | | |
| 5,259,336 A | 11/1993 | Clark | | |
| 5,273,083 A | 12/1993 | Burrows | | |
| D350,842 S | 9/1994 | VanSkiver | | |
| 5,344,048 A | 9/1994 | Bonerb | | |
| 5,365,879 A | 11/1994 | Ying-Kuan | | |
| 5,402,751 A | 4/1995 | De La Chevrotiere et al. | | |
| D374,516 S | 10/1996 | Lillelund et al. | | |
| 5,590,623 A | 1/1997 | Toole et al. | | |
| 5,699,754 A | 12/1997 | Chahjla | | |
| D402,425 S | 12/1998 | Lacz et al. | | |
| 5,988,108 A | 11/1999 | Silver | | |
| 6,055,932 A * | 5/2000 | Weber | .................. | A01K 5/0114 119/52.1 |
| 6,079,361 A * | 6/2000 | Bowell | .................... | A01K 7/02 119/52.1 |
| 6,109,315 A | 8/2000 | Stern | | |
| 6,119,629 A | 9/2000 | Sicchio | | |
| 6,135,058 A | 10/2000 | Jaeger | | |
| 6,138,609 A | 10/2000 | Gordon | | |
| 6,152,302 A | 11/2000 | Miller et al. | | |
| 6,371,048 B1 | 4/2002 | Smith | | |
| 6,408,790 B1 | 6/2002 | Maguire | | |
| 6,467,428 B1 * | 10/2002 | Andrisin | .............. | A01K 5/0114 119/51.5 |
| 6,474,262 B1 | 11/2002 | Ceccon | | |
| 6,561,130 B1 | 5/2003 | Sage | | |
| 6,581,540 B1 | 6/2003 | LaVanish | | |
| 6,615,765 B1 | 9/2003 | Thomas | | |
| 6,742,476 B2 | 6/2004 | Sage | | |
| 6,863,025 B2 * | 3/2005 | Ness | ........................ | A01K 7/02 119/51.5 |
| 6,953,069 B2 | 10/2005 | Galomb | | |
| 6,971,331 B1 | 12/2005 | Rohrer | | |
| 7,040,249 B1 * | 5/2006 | Mushen | ................. | A01K 7/005 119/51.5 |
| 7,234,418 B2 | 6/2007 | Fort et al. | | |
| 7,578,261 B2 * | 8/2009 | Fick | ..................... | A01K 5/0114 119/51.01 |
| 8,336,493 B1 * | 12/2012 | Weber | ..................... | A01K 5/00 119/52.1 |
| 8,640,648 B2 | 2/2014 | Lathim | | |
| 8,899,181 B2 | 12/2014 | Lathim | | |
| 9,137,967 B2 | 9/2015 | Lathim | | |
| 2003/0192480 A1 | 10/2003 | Bennett | | |
| 2004/0025797 A1 | 2/2004 | Sjogren | | |
| 2004/0129233 A1 | 7/2004 | Northrop et al. | | |
| 2004/0149232 A1 | 8/2004 | Griffin | | |
| 2004/0163604 A1 | 8/2004 | Kirk et al. | | |
| 2005/0028743 A1 * | 2/2005 | Wechsler | ............. | A01K 39/026 119/52.1 |
| 2006/0196438 A1 | 9/2006 | Caputa et al. | | |
| 2006/0231040 A1 | 10/2006 | Bast et al. | | |
| 2007/0119378 A1 | 5/2007 | Fick | | |
| 2008/0202436 A1 * | 8/2008 | Romeu Guardia | .. | A01K 5/0225 119/52.1 |
| 2009/0188432 A1 | 7/2009 | McMullen | | |
| 2009/0199778 A1 | 8/2009 | Kratzer et al. | | |

OTHER PUBLICATIONS

Response filed Apr. 2, 2013 to Non-Final Office Action dated Oct. 22, 2012 from U.S. Appl. No. 12/944,624, 9 pages.
Final Office Action dated May 20, 2013 from U.S. Appl. No. 12/944,624, 7 pages.
Response filed Aug. 2, 2013 to Final Office Action dated May 20, 2013 from U.S. Appl. No. 12/944,624, 9 pages.
Non-Final Office Action dated Aug. 1, 2014 from U.S. Appl. No. 12/944,624, 7 pages.
Response filed Nov. 3, 2014 to Non-Final Office Action dated Aug. 1, 2014 from U.S. Appl. No. 12/944,624, 15 pages.
Final Office Action dated Feb. 20, 2015 from U.S. Appl. No. 12/944,624, 8 pages.
Response filed Jun. 22, 2015 to Final Office Action dated Feb. 20, 2015 from U.S. Appl. No. 12/944,624, 11 pages.
Notice of Allowance dated Jul. 17, 2015 from U.S. Appl. No. 12/944,624, 6 pages.
Non-Final Office Action dated Jan. 19, 2012 from U.S. Appl. No. 12/946,734, 6 pages.
Response filed Mar. 22, 2012 to Non-Final Office Action dated Jan. 19, 2012 from U.S. Appl. No. 12/946,734, 7 pages.
Final Office Action dated Jul. 18, 2012 from U.S. Appl. No. 12/946,734, 9 pages.
Response filed Jan. 16, 2013 to Final Office Action dated Jul. 18, 2012 from U.S. Appl. No. 12/946,734, 8 pages.
Non-Final Office Action dated Dec. 26, 2013 from U.S. Appl. No. 12/946,734, 12 pages.
Response filed Apr. 28, 2014 to Non-Final Office Action dated Dec. 26, 2013 from U.S. Appl. No. 12/946,734, 11 pages.
Applicant Initiated Interview Summary dated May 1, 2014 from U.S. Appl. No. 12/946,734, 3 pages.
Notice of Allowance and Examiner Initiated Interview Summary dated Sep. 24, 2014 from U.S. Appl. No. 12/946,734, 13 pages.
U.S. Appl. No. 61/261,058, entitled "Feed Dispenser Apparatus", Inventor: Del Lathim, filed Nov. 13, 2009, 13 pages.
Non-Final Office Action dated Sep. 27, 2012 from U.S. Appl. No. 12/904,837, 8 pages.
Response filed Mar. 21, 2013 to Non-Final Office Action dated Sep. 27, 2012 from U.S. Appl. No. 12/904,837, 8 pages.
Final Office Action dated May 3, 2013 from U.S. Appl. No. 12/904,837, 8 pages.
Applicant-Initiated Interview Summary dated Jul. 18, 2013 from U.S. Appl. No. 12/904,837, 3 pages.
Response filed Jul. 23, 2013 to Final Office Action dated May 3, 2013 from U.S. Appl. No. 12/904,837, 10 pages.
Advisory Action dated Aug. 14, 2013 from U.S. Appl. No. 12/904,837, 4 pages.
Notice of Allowance and Examiner-Initiated Interview Summary dated Sep. 30, 2013 from U.S. Appl. No. 12/904,837, 11 pages.
U.S. Appl. No. 61/252,038, entitled "Media Apparatus", Inventor: Del Lathim, filed Oct. 15, 2009, 14 pages.
U.S. Appl. No. 61/252,818, entitled "Water Dispenser Apparatus", Inventor: Del Lathim, filed Nov. 19, 2009, 14 pages.

* cited by examiner

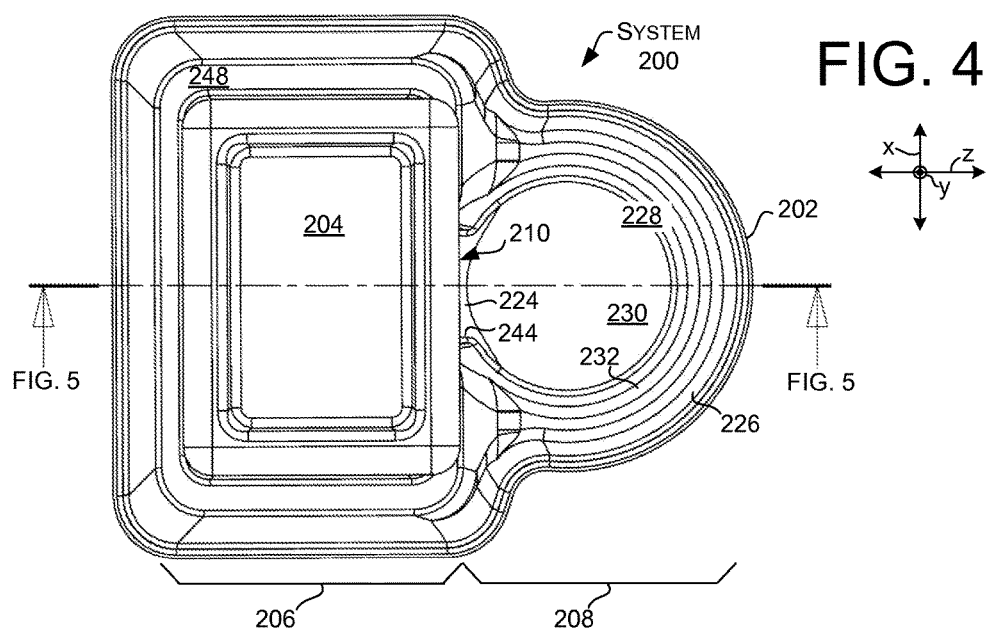
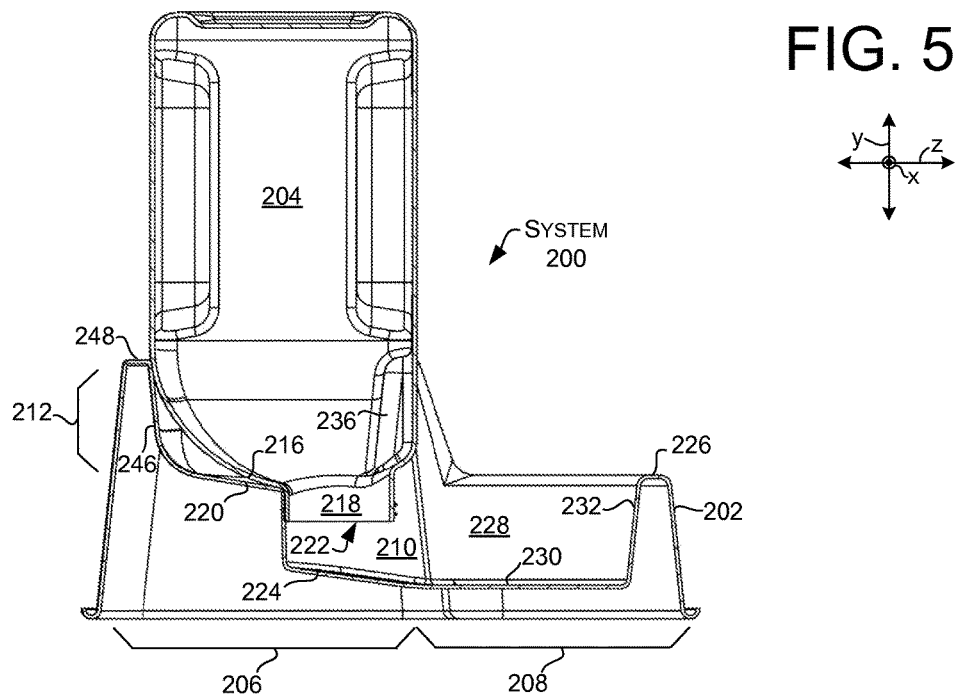

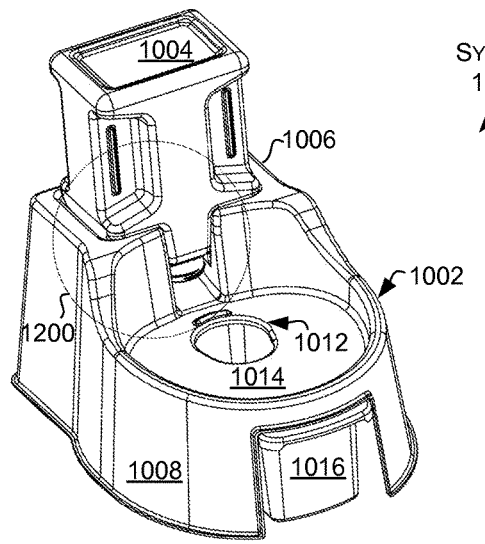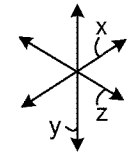
FIG. 12
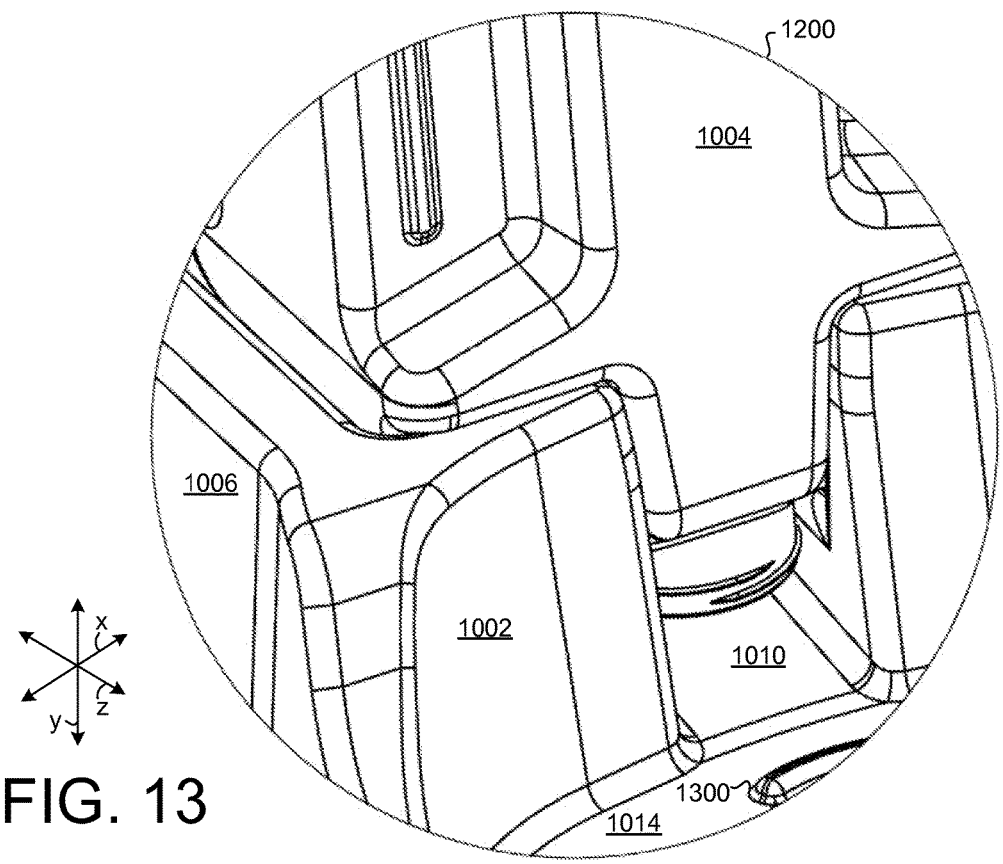
FIG. 13

US 9,907,291 B2

PET CARE SYSTEM

PRIORITY

This utility application is a Continuation-In-Part of, and claims priority from, U.S. Utility application Ser. No. 12/944,624 filed on 2010 Nov. 11 and U.S. Provisional Application No. 61/261,058 filed on 2009 Nov. 13, which are incorporated by reference in their entirety. This application is also a non-provisional of, and claims priority from, U.S. Provisional Application No. 61/917,218 filed on 2013 Dec. 17, which is incorporated by reference in its entirety.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIG. 4 is a top view of an example material dispensing system in accordance with some of the present concepts.

FIG. 5 is a sectioned elevational view as indicated in FIG. 4 of an example material dispensing system in accordance with some of the present concepts.

FIGS. 10-13 are perspective views of an example material dispensing system in accordance with some of the present concepts.

DETAILED DESCRIPTION

Overview

The present description relates to a material dispensing system that automatically dispenses materials, such as pet care materials. The material dispensing system can dispense solid and/or liquid material, providing versatility in pet care scenarios. For example, the material dispensing system can function as a feeder, a waterer, and/or a litter box for animals.

Figure 1:
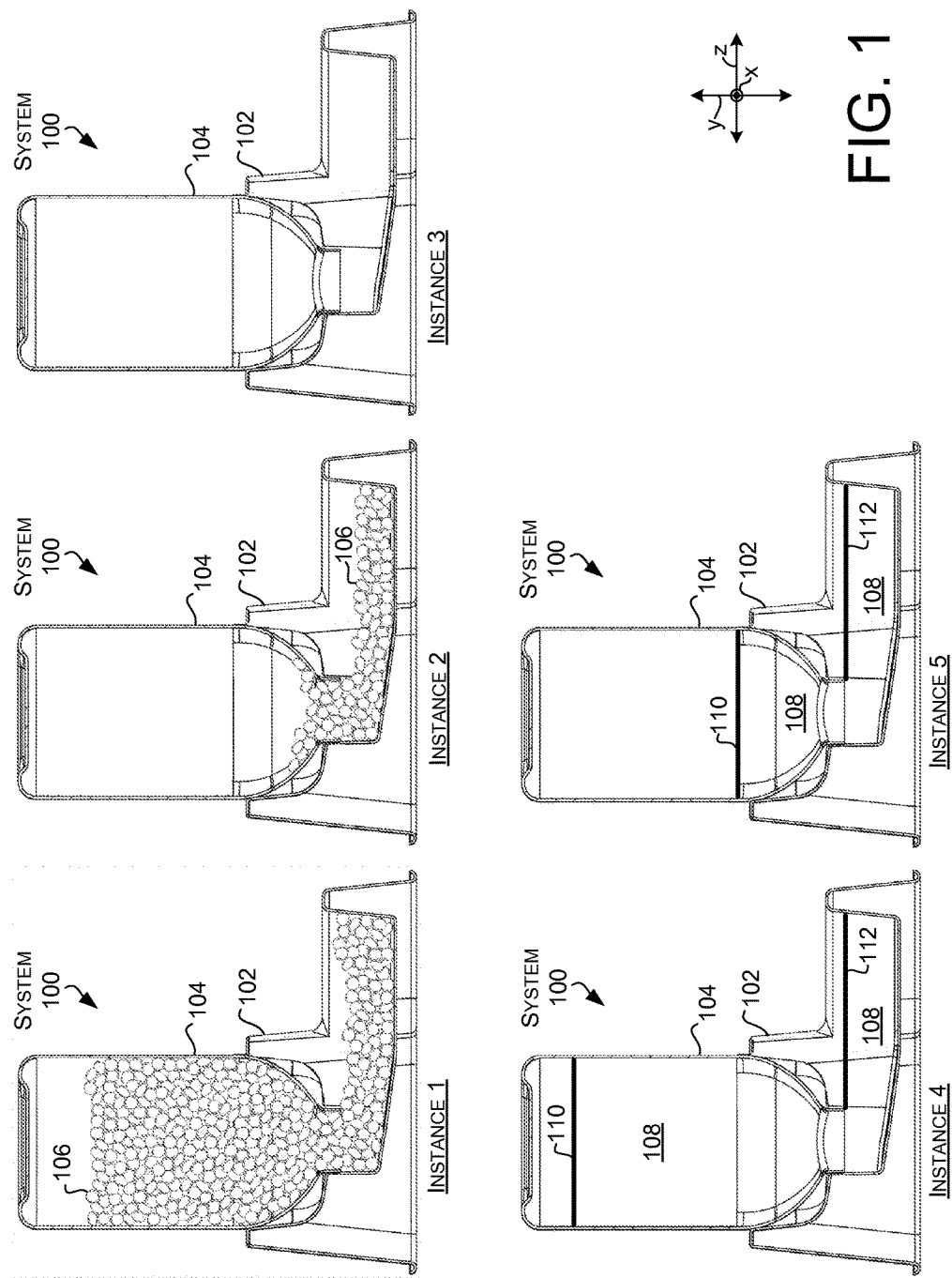
FIG. 1 illustrates sectional views of several instances of an example material dispensing system in accordance with some of the present concepts.

FIG. 1 shows five instances of an example material dispensing system 100. In this example, the material dispensing system 100 can include a material dispenser apparatus 102 and a material container 104. As illustrated in Instance 1, the material container can contain a solid material 106. In this example, the solid material can be animal feed, such as kibble, pellets, chunks, among others, which can have a variety of sizes and/or hardness values, and/or combinations of solid materials. In Instance 1, the material container has been placed on the material dispenser apparatus such that the solid material can automatically dispense into the material dispenser apparatus in a self-regulating manner. For example, a user (e.g., pet owner) can remove a cap (e.g., seal) (not shown) on the material container, attach the material dispenser apparatus to the material container while the material container is upright, then turn the material dispensing system over and place the material dispenser apparatus on the floor, where it is accessible to an animal.

In some cases, dispensing will automatically stop once material starts to build up in the material dispenser apparatus 102 due to design aspects of the material dispenser apparatus (described further below relative to FIGS. 2-5). Consumption of the solid material 106 from the material dispenser apparatus can cause the solid material to be automatically replenished from the material container 104, as shown in Instance 2. Thus, this configuration can be thought of as providing automatic feeding in a self-regulated manner to avoid feed spillage, feed wastage and/or promote feed freshness. In this example, once the user inserts the material container into the material dispenser apparatus, no further user action is required until all of the solid material is dispensed, as illustrated in Instance 3.

In some implementations, such as subsequent to Instance 3, the user can detach the material container 104 from the material dispenser apparatus and additional material and/or a different material can be placed inside the material container. Alternatively, a new material container could be used with the material dispenser apparatus 102. As illustrated in Instance 4, liquid material 108 (e.g., water) has been added to the material container 104, which the user has then placed back onto the material dispenser apparatus. For example, as described above for the solid material, a user can fill the material container with water, attach the material dispenser apparatus to the material container while the material container is upright, then turn the material dispensing system over and place the material dispenser apparatus on the floor. In this case, no adjustment and/or change to the material dispensing system was made to dispense the liquid material as opposed to the solid material.

In the case of Instance 4, the liquid material 108 can automatically dispense from the material container 104 into the material dispenser apparatus 102 in a self-regulating manner. The material dispensing system 100 can be designed such that the liquid material can have an upper surface 110 inside the material container and a lower surface 112 within the material dispenser apparatus. As illustrated in Instance 5, the upper surface 110 can be lowered. For example, when a pet drinks water from the material dispenser apparatus, as the volume of water in the material dispensing system is reduced, a level of upper surface 110 inside the material container can drop while a level of lower surface 112 within the material dispenser apparatus is maintained.

The order of Instances 1-5 shown in FIG. 1 is for illustration purposes and is not meant to be limiting. The material container 104 can be provided with the material dispenser apparatus 102 or provided separately. In some implementations, the material container can be provided preloaded with a solid and/or a liquid material. The preloaded material container can be reusable or intended for one-time use. In cases where the material container is reusable, the material container can be refilled with a solid and/or liquid material, despite the solid or liquid nature of the original preloaded contents. Thus, the material dispensing system 100 can provide flexibility to the user, including convenient packaging of solid and/or liquid material in preloaded material containers, refilling material containers with a variety of materials, and interchangeability of multiple material containers with multiple material dispenser apparatuses.

Beyond the ease of use offered by the present implementations, the inventive concepts offer additional potential advantages. For instance, animal feed can degrade over time. For example, animal feed can degrade because exposure to air can oxidize the animal feed. The oxidization can make the animal feed go rancid or otherwise degrade. To address this issue, animal feed manufacturers can create a controlled environment within the material container 104. For instance, the material container can be air-impermeable to limit exposure to air. Further, after animal feed is added to the material container, air may be purged from the material container and replaced with a more inert gas, such as nitrogen or carbon dioxide, among others. Another approach that can be employed is to coat the inside of the material container with preservatives and/or antioxidants to slow down degradation of the animal feed. These configurations can maintain the quality of the animal feed for an extended period of time.

However, existing feeders tend to require a user to open a feedbag or other material container and pour the animal feed into a bin, hopper, or other container from which it is dispensed. This configuration defeats the efforts of the feed manufacturer and from this point forward the feed starts to degrade at an accelerated rate.

In contrast, the present implementations do not require transfer of the animal feed to a secondary container. Instead, these implementations can maintain a majority of the animal feed in the original material container. This configuration is more convenient for the user and can keep the animal feed with the preservatives/antioxidants to slow degradation of the animal feed.

For instance, if the feed manufacturer replaced the ambient air in the material container 104 with a more inert gas, this inert gas may generally remain in the material container even after the material container is opened and inserted into the material dispenser apparatus 102. From one perspective, the present implementations limit or reduce the exposure of the animal feed to air and/or decrease airflow around the animal feed. Thus, the present implementations can slow degradation of the animal feed that results from traditional scenarios where a large portion of the material container is opened to the air, the animal feed is transferred to another container, and/or the animal feed has a greater exposure to air.

FIGS. 2-7 collectively illustrate another example material dispensing system 200, which can include a material dispenser apparatus 202 and a material container 204. The material dispenser apparatus 202 can have a material storage portion 206 and a material presentation portion 208. As such, the material dispenser apparatus can be considered to have a storage side (e.g., rear side) and a presentation side (e.g., front side). The material storage portion can be open to the material presentation portion via a material control passage 210 defined by the material dispenser apparatus.

Figure 2:
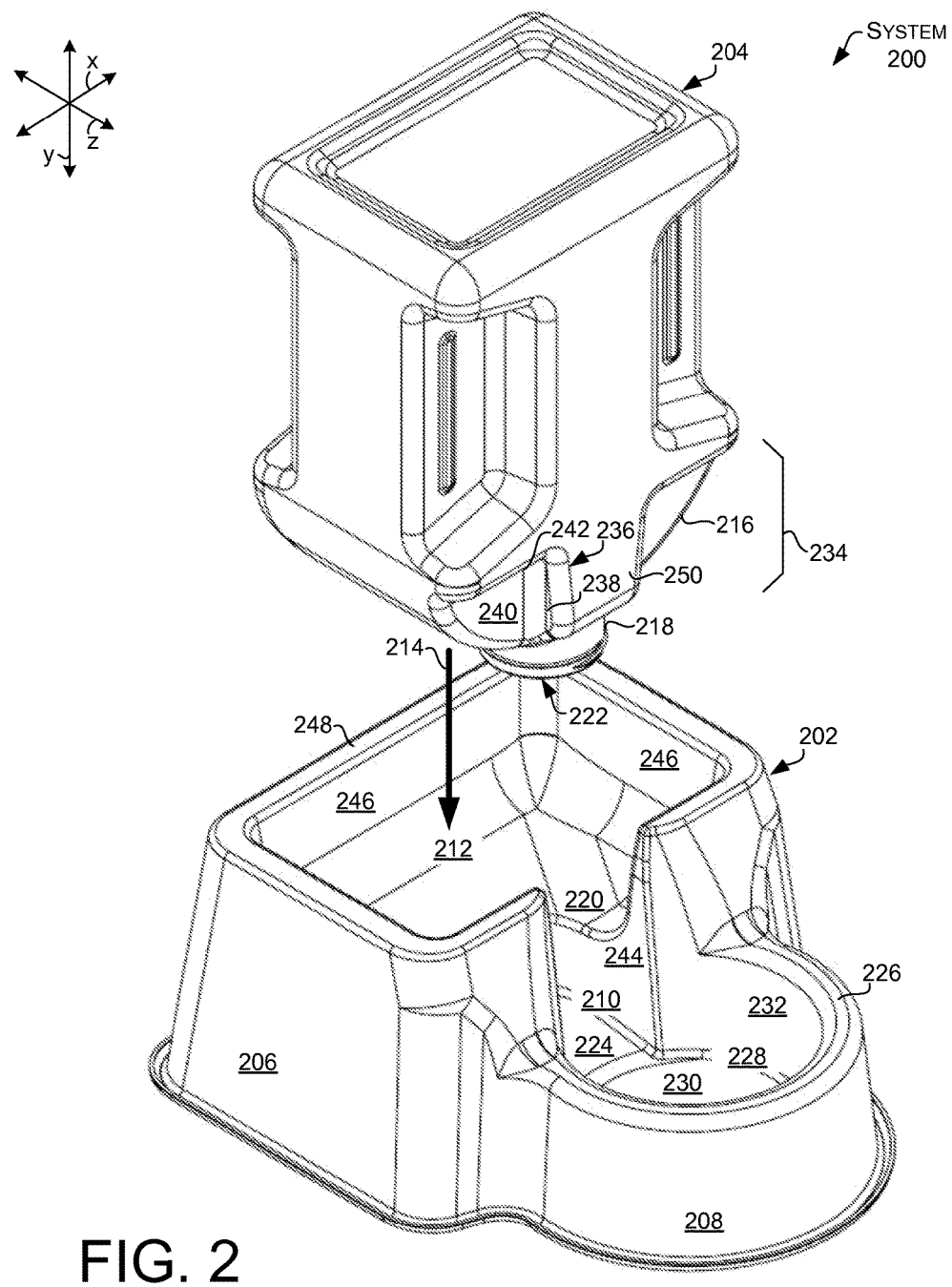
FIGS. 2-3 are perspective views of an example material dispensing system in accordance with some of the present concepts.
Figure 3:
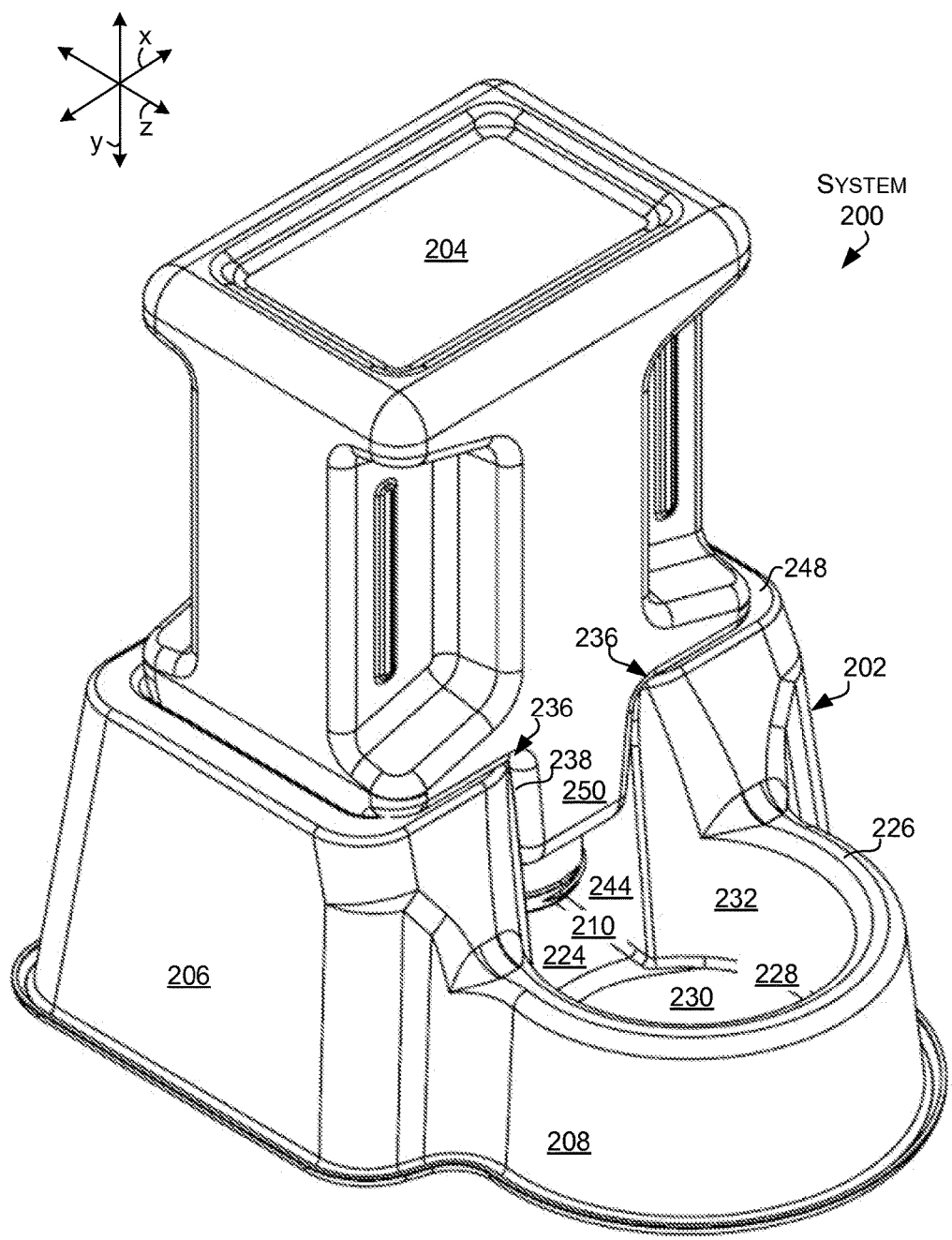

As shown collectively in FIGS. 2-3, the material storage portion 206 of the material dispenser apparatus 202 can define a material receiving volume 212 for receiving the material container 204, as indicated at arrow 214. For example, the material container can be placed in the material receiving volume of the material dispenser apparatus. Such a placement can allow material to automatically dispense from the material container, through the material control passage 210, and into the material presentation portion 208.

In some implementations, the material container 204 can have shoulders 216 and a neck 218. The shoulders can allow the material container to rest on a storage surface 220 of the material storage portion 206. In some cases, the neck can extend downwardly from the shoulders into the material control passage 210. In this manner an opening 222 of the material container can be held above a ramp surface 224 of the material control passage such that material passes out of the material container into the material control passage (see FIG. 5). Further, the opening 222 of the material container can be below an outer rim 226 of the material presentation portion 208. A height of the outer rim can allow material to automatically dispense from the material container into the material presentation portion without spilling out of (e.g., overflowing) the material presentation portion.

In some implementations, the material presentation portion 208 can be thought of as defining a material presentation volume 228. The material presentation volume can be partially defined by a presentation surface 230 of the material presentation portion. In this case, the ramp surface 224 is slanted so that material flows from the material storage portion 206 into the material presentation portion. The material can come to rest against a presentation wall(s) 232 of the material presentation portion 208. In some cases, equilibrium is reached between the level of the material in material presentation volume 228 and the material in the material container 204 such that further material is not dispensed until some is removed from the material presentation volume by the animal. In the case of animal feed, this configuration reduces waste and/or promotes high quality feed being automatically dispensed to the animal.

As shown in the example in FIGS. 2-7, the material container 204 can have an asymmetrical shape. In some implementations, the shoulders 216 and neck 218 of the material container 204 can be designed (e.g., formed, arranged) asymmetrically such that the shoulders and neck control an orientation in which the material container is placed in the material receiving volume 212 of the material dispenser apparatus 202. For example, a vertical plane can be defined by the y and z reference axes shown in FIGS. 2-7. The asymmetrical shape of the material container and/or the material dispenser apparatus can control the orientation in which the material container is placed in the material receiving volume with respect to the vertical plane, by not allowing the material container to spin about the y axis (e.g., vertical reference axis).

Alternatively or additionally, the material container 204 can have a key structure 234. In one example, the key structure can control the orientation in which the material container is placed in the material receiving volume 212 (as described above). Alternatively or additionally, the key structure can help stabilize the material container when it is placed in the material dispenser apparatus 202. The key structure can be designed to engage the material control passage 210 and/or another part of the material dispenser apparatus.

In the example shown in FIGS. 2-7, the key structure 234 can include passage wall interaction regions 236. The passage wall interaction region(s) can include a variety of structures for engaging, aligning, and/or interlocking with the material dispenser apparatus 202. For example, the passage wall interaction regions can have alignment side walls 238, alignment faces 240, and alignment ceilings 242.

The passage wall interaction regions can be received by a corresponding shape of passage walls 244 of the material control passage 210. In this manner, the key structure can be received by and/or engage the material control passage of the material dispenser apparatus 202. Stated another way, the passage walls can slidably receive the passage wall interaction regions. As such, the passage wall interaction regions and/or passage walls can control the orientation in which the material container 204 is placed in the material receiving volume 212.

As shown in FIGS. 2-7, the material control passage 210 can be open at a top end (shown but not designated). For example, the material storage portion 206 of the material dispenser apparatus 202 can include storage walls 246. The storage walls can have an upper rim 248. The upper rim can be discontinuous proximate the material control passage 210 (e.g., the upper rim can terminate at the passage walls 244), such that the top end of the material control passage is open.

In this example, an alignment ridge 250 of the material container 204 can be designed to extend from the material receiving volume 212 into the material control passage 210 when the material container is placed in the material receiving volume 212. The alignment ridge can be considered part of the key structure 234. For instance, when the material container is placed in the material dispenser apparatus 202, the alignment side walls 238 can rest against the passage walls, the alignment faces 240 can rest against the storage walls, and the alignment ceilings 242 can rest against the upper rim 248. In this manner, both the storage surface 220 and the upper rim can support weight of the material container. In some cases, the storage surface can support a relatively large portion (e.g., majority) of the weight, while the upper rim can support a relatively small portion (e.g., minority) of the weight. In this example, the material container rests on a portion of the upper rim. In some implementations, the material container can be designed to rest on more or less of the upper rim. Further, more or less of the weight of the material container can be supported by different features of the material dispenser apparatus.

In some implementations, the key structure 234 and/or the passage walls 244 can help stabilize the material container 204. For instance, when the passage walls are slidably received by the passage wall interaction regions 236, the alignment ridge 250 can be considered locked into the top end of the material control passage 210. This locked state can provide additional stability to the material dispensing system 200, such as if an animal bumps against it (e.g., prevent the material container from tipping toward the material presentation portion 208). The stability can be afforded even though the material control passage 210 is open at the top end. Additionally or alternatively, a height of the upper rim 248 of the storage walls 246 can help prevent the material container from tipping, rocking, and/or falling out of the material dispenser apparatus 202.

In some implementations, the material dispenser apparatus 202 of the material dispensing system 200 can be configured to be nestably stackable. This configuration can reduce shipping costs so that a high quality product can be delivered to the user at a reduced cost. For example, referring to FIG. 2, the material dispenser apparatus 202 can have slanted surfaces such that a second material dispenser apparatus is nestably stackable with the material dispenser apparatus 202. Stated another way, walls of the material storage portion 206 (e.g., storage walls 246), the material presentation portion 208 (e.g., presentation walls 232), and/or passage walls 244 can be angled (e.g., oblique) with respect to the z reference axis (e.g., vertical axis). To further enable nested stacking, a width of the material control passage 210 proximate the ramp surface 224 can be smaller than a width of the material control passage at the top end proximate the upper rim 248 of the storage walls 246 of the material storage portion 206. Stated another way, the passage walls of the material control passage can approximate a V-shape when viewed from the presentation side (e.g., front end) along the z-reference axis. In this case, the V-shape can be considered truncated on a lower end of the material control passage by the ramp surface. Furthermore, in some cases the key structure 234 can also have the V-shape such that the key structure is slidably received by the passage walls. For instance, the alignment side walls 238 can be formed such that the alignment ridge 250 features a portion of the truncated V-shape of the material control passage, allowing the alignment ridge to slide down into the material control passage with the alignment side walls resting against the passage walls.

In some cases, "nestably stackable" can mean that the material storage portion 206 of the material dispenser apparatus 202 is able to receive a material storage portion of a second material dispenser apparatus (not shown) when the material dispenser apparatus 202 is stacked over the second material dispenser apparatus. For instance, when stacked, an underside of the storage surface 220 of the material dispenser apparatus 202 may come within 0.5 inches, for example, of an upper side of a storage surface of the second material dispenser apparatus. In this instance, an under side of the outer rim 226 of the material presentation portion 208 of the material dispenser apparatus 202 may come within 0.5 inches, for example, of an upper side of a outer rim of the second material dispenser apparatus.

Other shapes, dimensions, and/or structures are contemplated for the material dispenser apparatus 202 to receive the material container 204, to control an orientation of the material container, to support the weight of the material container, and/or to provide stability to the material dispensing system. In other implementations, the material container and/or the material receiving volume can be relatively symmetrical, such as cylindrical or squared (e.g., material container 104 shown in FIG. 1). In cases where the material container is relatively symmetrical, the material dispenser apparatus can receive the material container without a specific orientation.

Figures 6, 7:
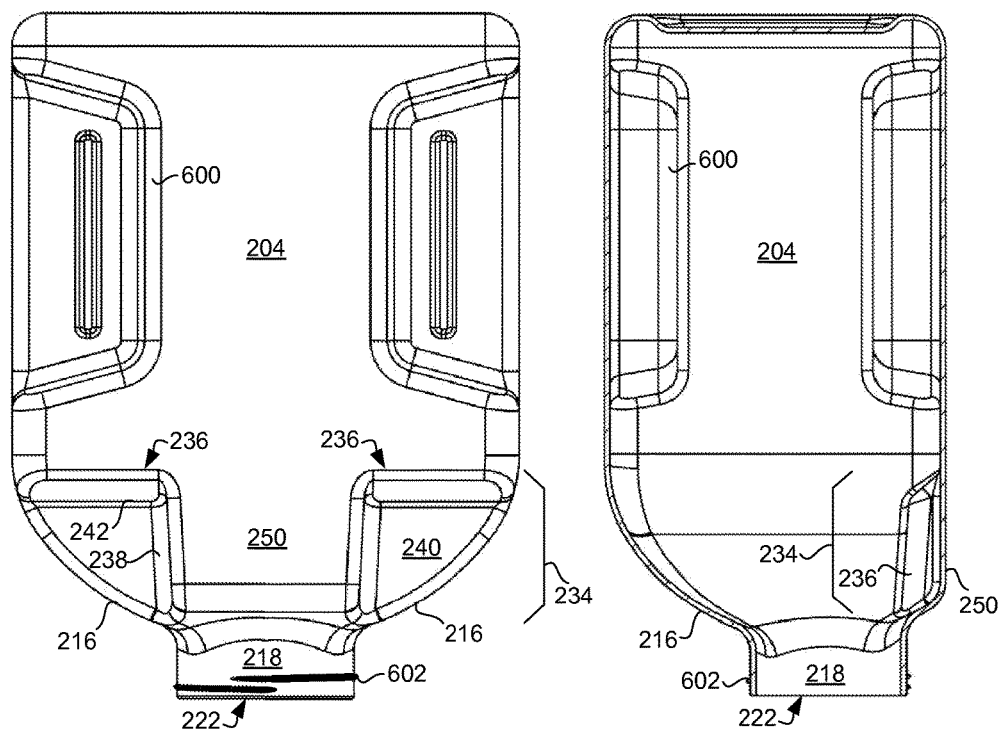
FIG. 6 is a front elevational view of an example material container in accordance with some of the present concepts.
FIG. 7 is a side elevational view of an example material container in accordance with some of the present concepts.

Referring to FIGS. 6-7, the material container 204 can be designed with indentations 600 or other structural elements. The indentations can function as hand-holds to make the material container easier for a user to pick up and/or carry. The neck 218 of the material container can have threading 602 for receiving a cap (not shown) that is removed prior to use. In some implementations, the threading on the neck can receive coordinating threading (not shown) on the material dispenser apparatus 202 to help secure the material container to the material dispenser apparatus.

Figures 8, 9:
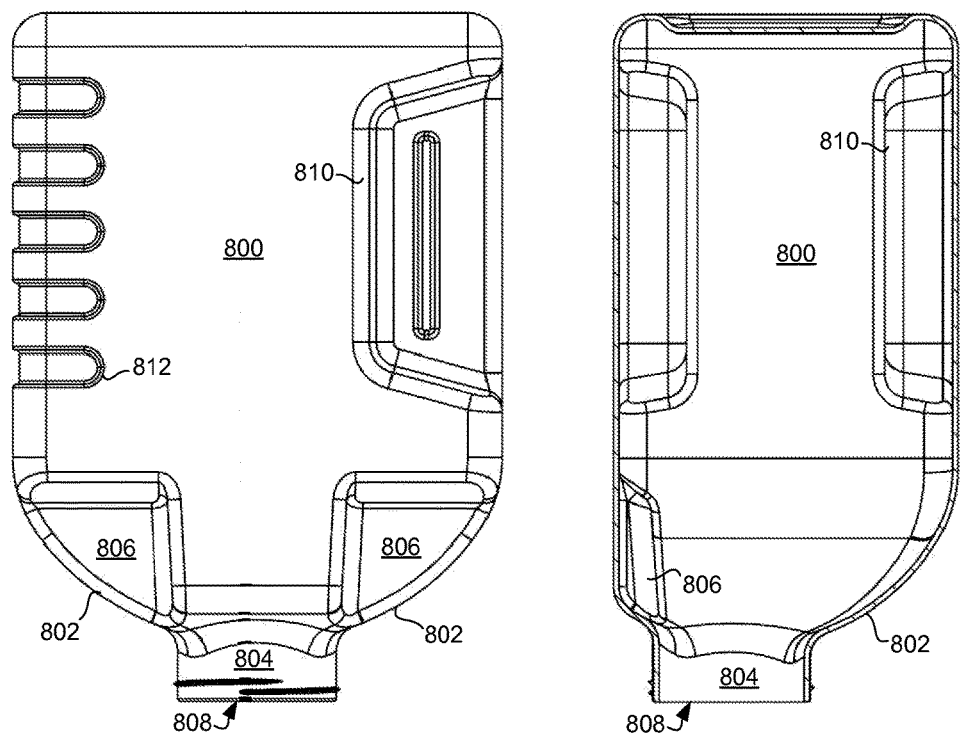
FIG. 8 is a front elevational view of an example material container in accordance with some of the present concepts.
FIG. 9 is a side elevational view of an example material container in accordance with some of the present concepts.
Figure 10:
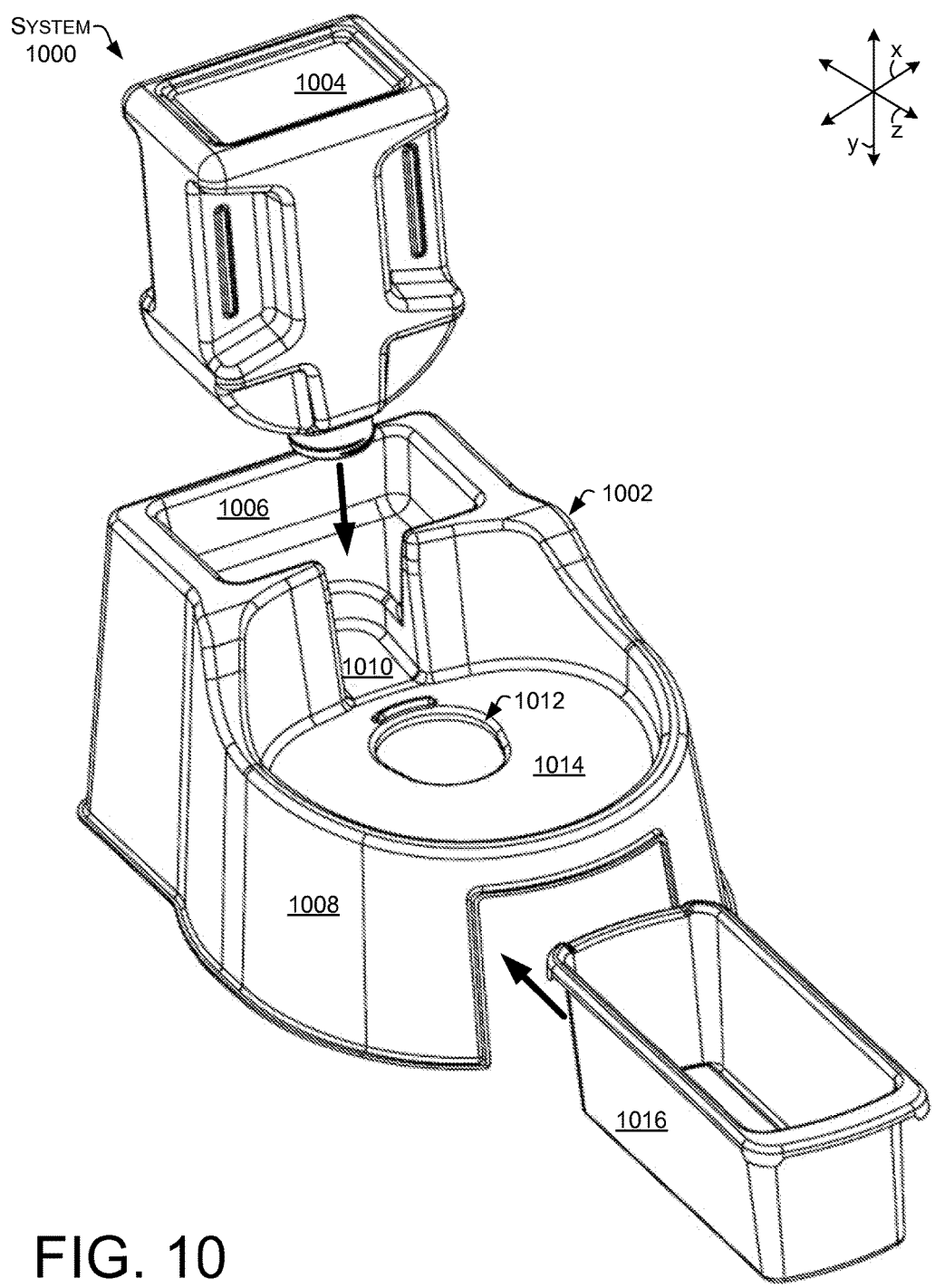
Figure 11:
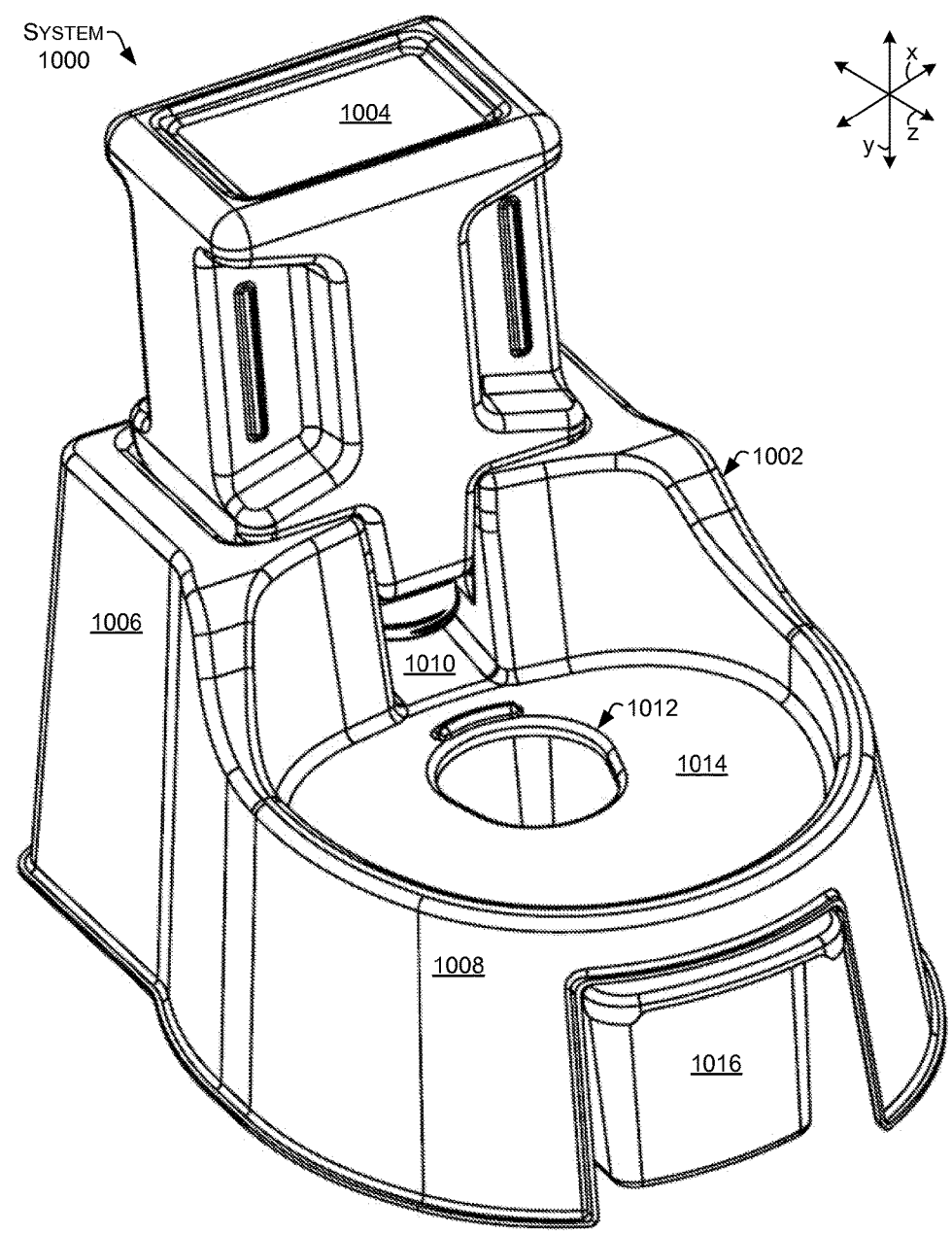
Figure 14:
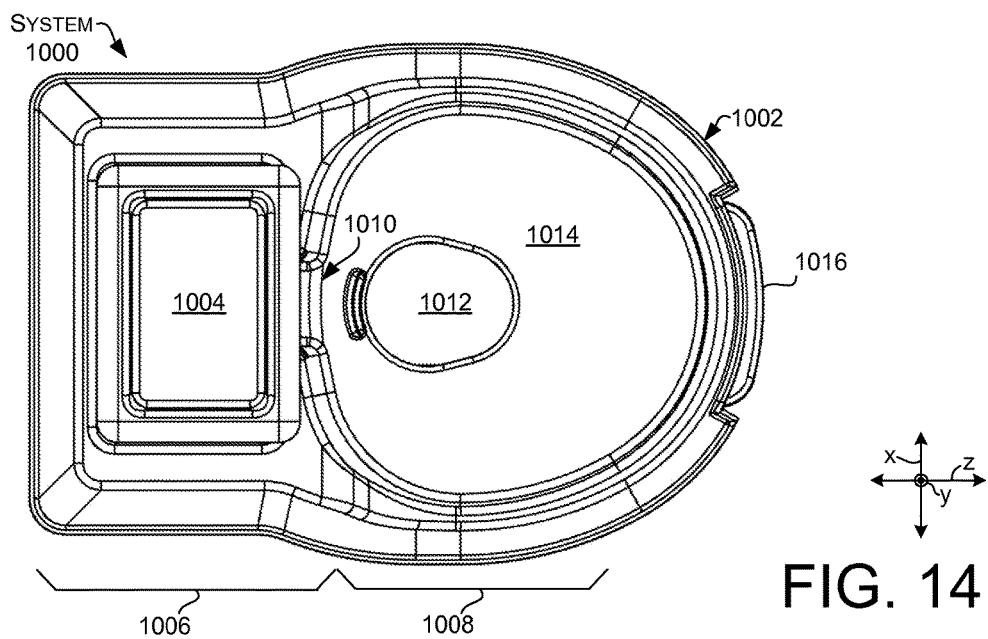
FIG. 14 is a top view of an example material dispensing system in accordance with some of the present concepts.
Figure 15:
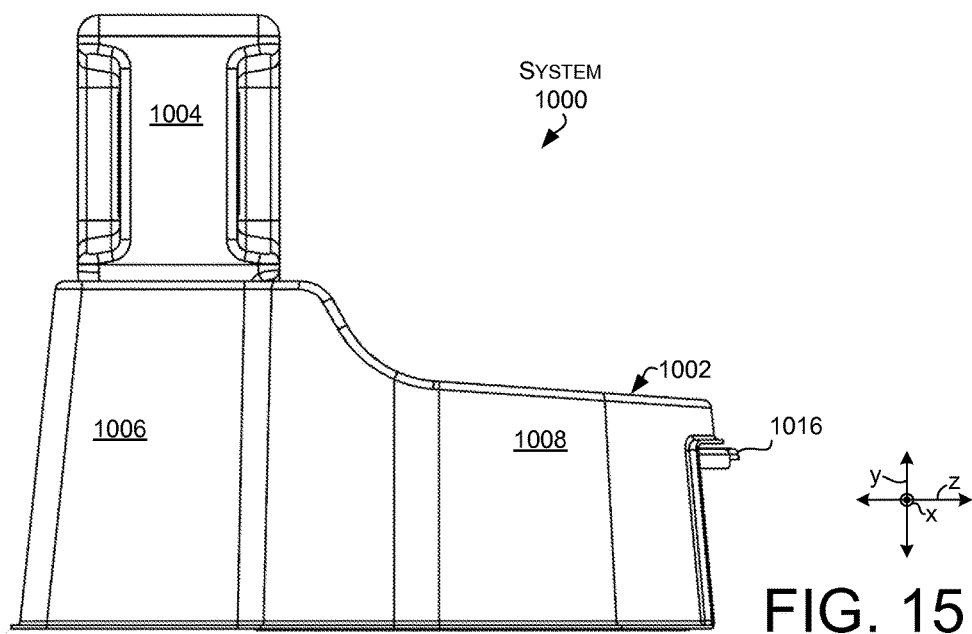
FIG. 15 is a side elevational view of an example material dispensing system in accordance with some of the present concepts.

FIGS. 8-9 show another example material container 800. Material container 800 can have shoulders 802, a neck 804, passage wall interaction regions 806, an opening 808, and indentations 810. Material container 800 can also have other indentations 812. As shown in the example in FIG. 8, the material container can have different shaped indentations (e.g., 810, 812) on different sides. In addition to functioning as hand-holds, indentations 810 and/or 812 can provide structural strength to the material container, and/or provide other functionality.

FIGS. 10-15 collectively show another example material dispensing system 1000. Material dispensing system 1000 can function as an animal litter box. For example, the material dispensing system can be utilized as a litter box for domestic cats, among others.

Material dispensing system 1000 can include a material dispenser apparatus 1002 and a material container 1004. The material container 1004 can be substantially similar to material container 204 shown in FIGS. 2-7. The material dispenser apparatus 1002 can have a material storage portion 1006 and a material presentation portion 1008. The material storage portion can be open to the material presentation portion via a material control passage 1010 defined by the material dispenser apparatus. The material dispensing system 1000 can have other features similar to those described above relative to the example in FIGS. 2-7. These features are shown in FIGS. 10-15, but not described for sake of brevity.

In material dispensing system 1000, the material presentation portion 1008 can define an opening 1012 proximate the material control passage 1010. In this case, the material presentation portion can include a bearing surface 1014 upon which an animal can stand to perform a bodily function through the opening 1012. The material dispensing system can also have a receptacle 1016. Also in this example, the material dispenser apparatus 1002 and/or the receptacle of the material dispensing system 1000 can be configured to be nestably stackable (as described above in relation to material dispensing systems 100 and 200).

The material control passage 1010 can allow an animal to transfer material from the material storage portion 1006 to the bearing surface 1014 and ultimately through opening 1012 and into the receptacle 1016. In this example, material container 1004 can contain a solid material, such as litter, that can automatically dispense in a self-regulating manner into the material control passage 1010. The material dispenser apparatus 1002 can have additional structures which may help facilitate the self-regulation of the dispensing of the material. For example, as shown in FIG. 13, which is a close-up view of inset 1200 from FIG. 12, the material dispenser apparatus can have a dispensing mediator 1300 formed on the bearing surface. The dispensing mediator can provide resistance to keep the material from flowing unchecked from the material control passage into opening 1012. The dispensing mediator can also be diminutive, such as to not hinder the animal from moving material onto the bearing surface.

In use, an animal (e.g., cat) can scratch a small amount of the litter from the material control passage 1010 to the bearing surface 1014. The animal can then relieve itself near opening 1012 while standing on the bearing surface. In some implementations, the bearing surface can be flat. In other implementations, the bearing surface can be sloped toward the opening 1012. In some cases the bearing surface can have a smooth finish, and in other cases the bearing surface can be textured to avoid slipping. The cat can follow its instinct and try to cover up its waste with the litter by scratching more litter from the material control passage.

In the example of the material dispensing system 1000 used as a litter box, only a small amount of litter is removed to the receptacle 1016 per litter box visit by the animal. The receptacle can be lined with a disposable plastic garbage bag that may or may not be scented. The bag can be easily removed and deposited in the garbage, as needed. In this manner, the material dispensing system 1000 does not require disposal of excessive amounts of litter, only the small amount scratched by the animal is disposed. Therefore, the purchase of large, heavy bags of litter is not needed. With the material dispensing system 1000, a single supply of litter in the material container 1004 can last over a month per cat.

At least some of the present implementations can offer additional potential advantages as an animal litter box. For instance, no hood is required with material dispensing system 1000 because the odor has been eliminated (e.g., significantly reduced). No cleaning pad is required because the animal generally does not touch the soiled litter. Cats enjoy using the material dispensing system and cat owners enjoy pleasing their cats. The material dispensing system can be inexpensive, easy to use, and sanitary. It can take up less space than other litter boxes on the market today.

The material dispensing system (e.g., material dispensing system 100, 200, and/or 1000), including the material dispenser apparatus, the material container, and/or the material receptacle, can be constructed of any suitable material such as a polymer, plastic, or composite. Any traditional fabrication technique, such as injection molding can be utilized to form the material dispensing system. The material dispenser apparatus, the material container, and/or the material receptacle, can be formed as a single piece or multiple pieces. Furthermore, in at least some configurations, surfaces of the material dispensing system can be blended into one another. Blended surfaces tend to be easy to clean and can reduce and/or avoid difficult to clean corners where dirt and/or algae may persist and threaten the health of the animal.

In summary, the present implementations can allow a user to easily provide a variety of solid and/or liquid materials for their animals. The materials are auto-dispensed for the animal by a durable, multi-use, easy-to-clean system.

Conclusion

Although specific examples of material dispensing systems are described in language specific to structural features, it is to be understood that the subject matter defined in the appended claims is not intended to be limited to the specific features described. Rather, the specific features are disclosed as exemplary forms of implementing the claimed statutory classes of subject matter.

The invention claimed is:

1. A material dispensing system, comprising:
a material dispenser apparatus defining a material storage portion having storage walls and an upper rim, a material presentation portion having an outer rim that is lower than the upper rim, and a material control passage having passage walls, the material presentation portion being open to the material storage portion via the material control passage; and
a material container supported by both the upper rim and a storage surface of the material storage portion when the material container is placed in the material dispenser apparatus, the material container including a key structure that engages the passage walls of the material control passage, the key structure comprising passage wall interaction regions that comprise alignment side walls, alignment faces, and alignment ceilings, and further wherein the upper rim is discontinuous above the material control passage and the passage wall interaction regions are configured to slidably receive ends of the discontinuous upper rim proximate the material control passage such that:
the alignment side walls rest against the passage walls of the material dispenser apparatus,
the alignment faces rest against the storage walls of the material dispenser apparatus, and the alignment ceilings rest against the discontinuous upper rim.

2. The material dispensing system of claim 1, wherein an inner surface of the passage walls of the material control passage extend above and below the storage surface, and wherein an inner surface of the storage walls of the material storage portion do not extend below the storage surface.

3. The material dispensing system of claim 2, the material control passage being open at a top end such that the upper rim of the material storage portion is discontinuous.

4. The material dispensing system of claim 3, wherein the passage walls of the material control passage include at least one planar area.

5. The material dispensing system of claim 1, wherein an upper end of a ramp surface of the material control passage is lower than the storage surface of the material storage portion.

6. The material dispensing system of claim 1, wherein the material container is held above a ramp surface of the material control passage when the material container is placed in the material dispenser apparatus with the key structure engaging the material control passage.

7. The material dispensing system of claim 6, wherein a neck of the material container extends downwardly from the storage surface of the material storage portion into the material control passage.

8. The material dispensing system of claim 1, wherein the key structure controls an orientation with which the material container is placed in the material dispenser apparatus.

9. The material dispensing system of claim 1, wherein the material dispensing system is configured such that material dispenses from the material container into the material presentation portion of the material dispenser apparatus in a self-regulating manner.

\* \* \* \* \*